United States Patent
Agnoff

[11] Patent Number: 5,213,189
[45] Date of Patent: May 25, 1993

[54] LOAD SEPARATING MECHANISM FOR A ROLLER CONVEYOR

[75] Inventor: Charles Agnoff, Wilmington, N.C.

[73] Assignee: Interroll Holding A.G., San Antonio, Switzerland

[21] Appl. No.: 887,898

[22] Filed: May 26, 1992

[51] Int. Cl.⁵ .............................................. B65G 13/00
[52] U.S. Cl. .................................. 193/35 A; 198/460; 198/463.4
[58] Field of Search ...................... 193/35 A, 35 G; 198/460, 463.4, 634

[56] References Cited

U.S. PATENT DOCUMENTS

| | | | |
|---|---|---|---|
| 4,527,937 | 7/1985 | Tomasello, Jr. | 193/35 A X |
| 4,646,909 | 3/1987 | vom Stein | 198/463.4 X |
| 4,809,836 | 3/1989 | Zilber | 193/35 A |

Primary Examiner—Robert P. Olszewski
Assistant Examiner—Cheryl L. Gastineau
Attorney, Agent, or Firm—Rhodes, Coats & Bennett

[57] ABSTRACT

A load separating mechanism for a roller conveyor includes an actuating member pivotally mounted at a discharge point on the conveyor and a stop member pivotally mounted at a load holding point upstream from the discharge point. The actuating member and stop member are operatively connected so that the stop member assumes a load blocking position to arrest further movement of the loads when a load load at the discharge point depresses the actuating member. The actuating member is biased to an extended position to cause the stop member to assume a load releasing position when the lead load is removed from the conveyor. The return of the actuating member to the extended position is delayed for a predetermined period after the lead load is removed from the discharge point.

16 Claims, 3 Drawing Sheets

LOAD SEPARATING MECHANISM FOR A ROLLER CONVEYOR

FIELD OF THE INVENTION

The present invention relates generally to roller conveyors and more particularly to a load separating mechanism for separating successive loads on a roller conveyor.

BACKGROUND OF THE INVENTION

When removing loads from a roller conveyor, it is usually desirable to prevent the entire run of loads from bearing against the lead load at the discharge end of the conveyor so that the lead load can be easily removed. Various types of load spacing mechanisms have been used in the past for separating the lead load from the remaining loads on the conveyor. In one type of device, an actuating lever is connected by mechanical means to a stop mechanism. When the lead load is positioned over the actuating lever, it depresses the actuating lever and causes the stop mechanism to extend upwardly into the path of the next adjacent load. When the lead load is removed from the end of the conveyor, the actuating lever returns to an extended position and the stop mechanism is retracted to allow the next successive load to move down the conveyor. One mechanism of this type is disclosed in the patent vom Stein, U.S. Pat. No. 4,646,909 which issued on Mar. 3, 1987.

Several drawbacks have been encountered with these prior art load separating mechanisms. One problem is the inadvertent release of the second load in line before the lead load is removed from the conveyor. This problem is sometimes encountered when the loads are conveyed on pallets. The load-carrying pallets do not always have a continuous bottom surface, but instead may have several cross boards extending across the bottom of the pallet. In this case, it is possible for the actuating lever to return to its upright position between the cross boards of the pallet causing the second load to be released before the lead load has been removed.

Another drawback associated with prior art load separating mechanisms is that the loads are released too quickly after a pallet is removed. The worker responsible for removing loads from the conveyor must have sufficient time to fully remove and dispose of the loads before the next load is released. In prior art load-separating mechanisms, the next load is released immediately as the lead load is lifted or partially removed from the discharge end of the conveyor.

SUMMARY AND OBJECTS OF THE INVENTION

The present invention comprises a load separating mechanism for a roller conveyor which overcomes the aforementioned disadvantages with prior art conveyors. The load separating mechanism of the present invention includes an actuating member pivotally mounted at a discharge point on the conveyor and a stop member pivotally mounted at a load holding point upstream from the discharge point. The actuating member and stop member are mechanically linked so that the stop member assumes a raised, load blocking position when the actuating member is depressed by a load at the discharge point. When the load at the discharge point is removed, the actuating member is returned by a biasing means to an extended position and causes the stop member to move to a load releasing position. A delay means is provided which delays the return of the actuating lever to an extended position thereby delaying the release of the next load in line. The amount of the delay of the actuating lever can be adjusted to achieve a predetermined period of delay. In the embodiment described, the delay means comprises a fluid dampener which is connected to the actuating lever.

Based on the foregoing, it is a primary object of the present invention to provide a load separating mechanism for separating a lead load at the discharge point on the conveyor from the remaining loads on the conveyor line so that the lead load can be removed more easily from the conveyor.

Another object of the present invention is to provide a load separating mechanism which will prevent the inadvertent release of loads from the load holding point on the conveyor before the lead load is removed.

Another object of the present invention is to provide a load separating mechanism including a delay means for delaying the release of loads from the load holding point for a predetermined time period after the lead load is removed from the discharge point.

Other objects and advantages of the present invention will become apparent and obvious from a study of the following description and the accompanying drawings which are merely illustrative of such invention.

DETAILED DESCRIPTION OF THE INVENTION

Figure 1:
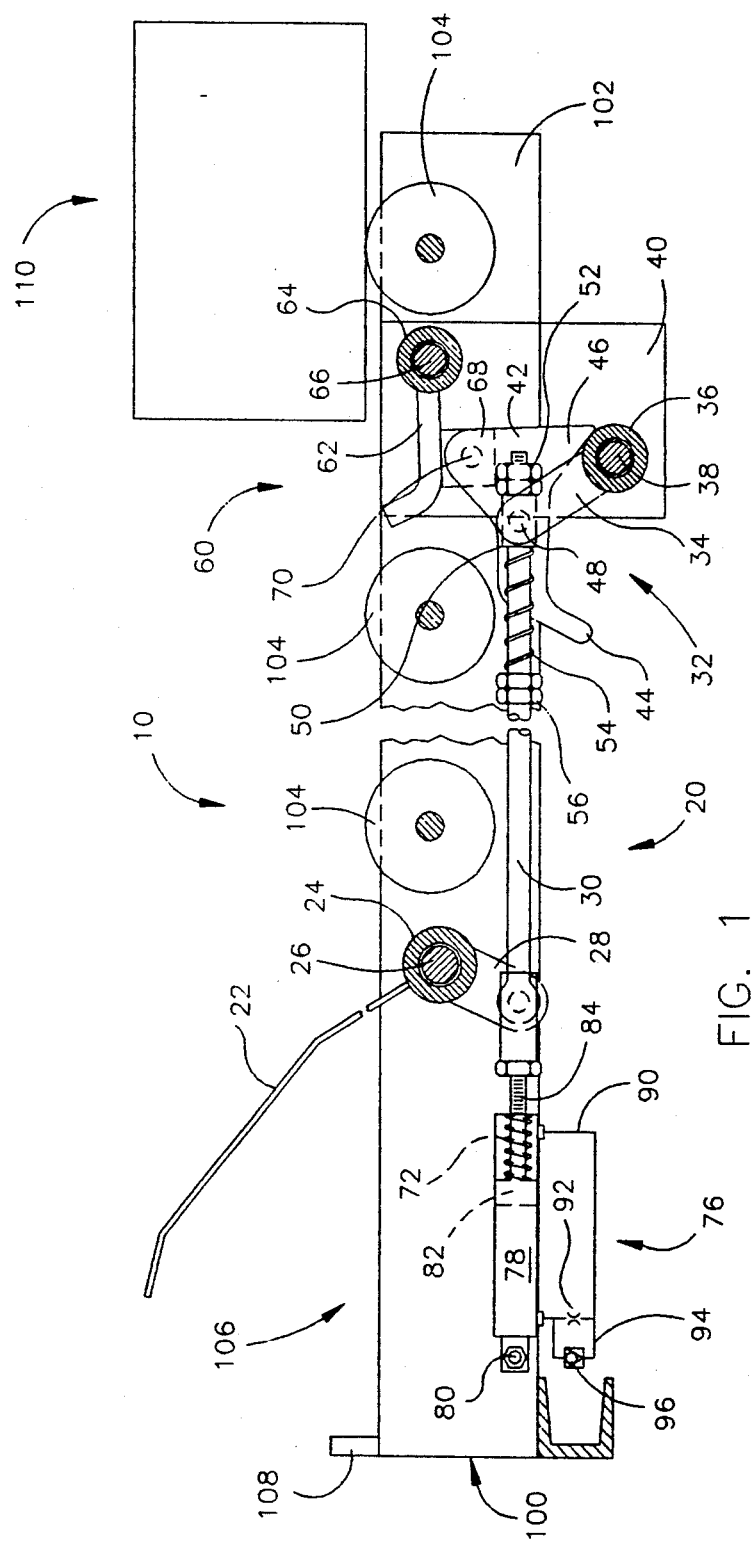
FIG. 1 is a longitudinal section view of a portion of a roller conveyor illustrating the load separating mechanism of the present invention in a load blocking position.

Referring now to the drawings, the load spacing mechanism 10 of the present invention is shown mounted adjacent the end of an inclined roller conveyor, indicated generally at 100. The conveyor comprises a pair of support frames 102, only one of which is shown, on which a plurality of idler rollers 104 are rotatively mounted at spaced apart intervals. The frames 102 are preferably inclined slightly such that the loads being conveyed move by gravity towards a discharge point 106 located at the downstream end of the conveyor. An end stop 108 is positioned at the end of each support frame to prevent the loads from running off the end of the conveyor 100 and to position the lead load so that it may be removed by suitable means, such as a fork lift truck, from the discharge end of the conveyor. A load holding point 110 is positioned upstream from the discharge point 106 for holding the loads following the lead load until the lead load is removed.

The load separating mechanism of the present invention is mounted to the conveyor frame 102. The purpose of the load separating mechanism is to separate the lead load from the subsequent loads so that the lead load can be easily removed from the conveyor. The load separating mechanism generally includes a stop means disposed upstream from the discharge point for blocking the movement of loads towards the discharge point, and an actuating means which is engaged by a load present at the discharge point for moving the stop means to a load blocking position. The stop means returns to a load-releasing position when the lead load is removed from the discharge point. Means are provided for delaying the return of the stop latch to the load-releasing position for a predetermined time period after the lead load is removed from the discharge point 106.

The actuating means 20 of the present invention comprises an actuating lever 22 having a sleeve 24 secured at one end thereof. The actuating lever 22 is mounted for pivotal movement about a pivot pin 26. The pivot pin 26 is preferably mounted to both of the parallel frame members 12. The actuating lever 22 also includes a lever arm 28 which is pivotally connected to one end of a connecting rod 30. The other end of the connecting rod 30 is pivotally connected to a toggle mechanism 32.

The toggle mechanism 32 includes a swing arm 34 and a rocker arm 42. The swing arm 34 includes a sleeve 36 and is pivotally mounted about a pivot pin 38. The pivot pin 38 is mounted on a bearing plate 40 which extends downwardly from the frame member 102. The rocker arm 42 is pivotally connected to the swing arm 34 and bearing sleeve 50 by pivot member 48. The end of the connecting rod 30 is slidably mounted in the bearing sleeve 50 and is secured by nuts 52.

The stop means 60 comprises a stop latch 62 having a sleeve 64 at one end thereof. The stop latch 62 is pivotally mounted about a pivot pin 66. The pivot pin 66 extends between the frame members 102. The stop latch 62 is pivotally connected to the rocker arm 42 by a connecting plate 68. The connecting plate 68 extends from the stop latch 62 and is connected to the rocker arm 42 by pivot member 70.

Figure 2:
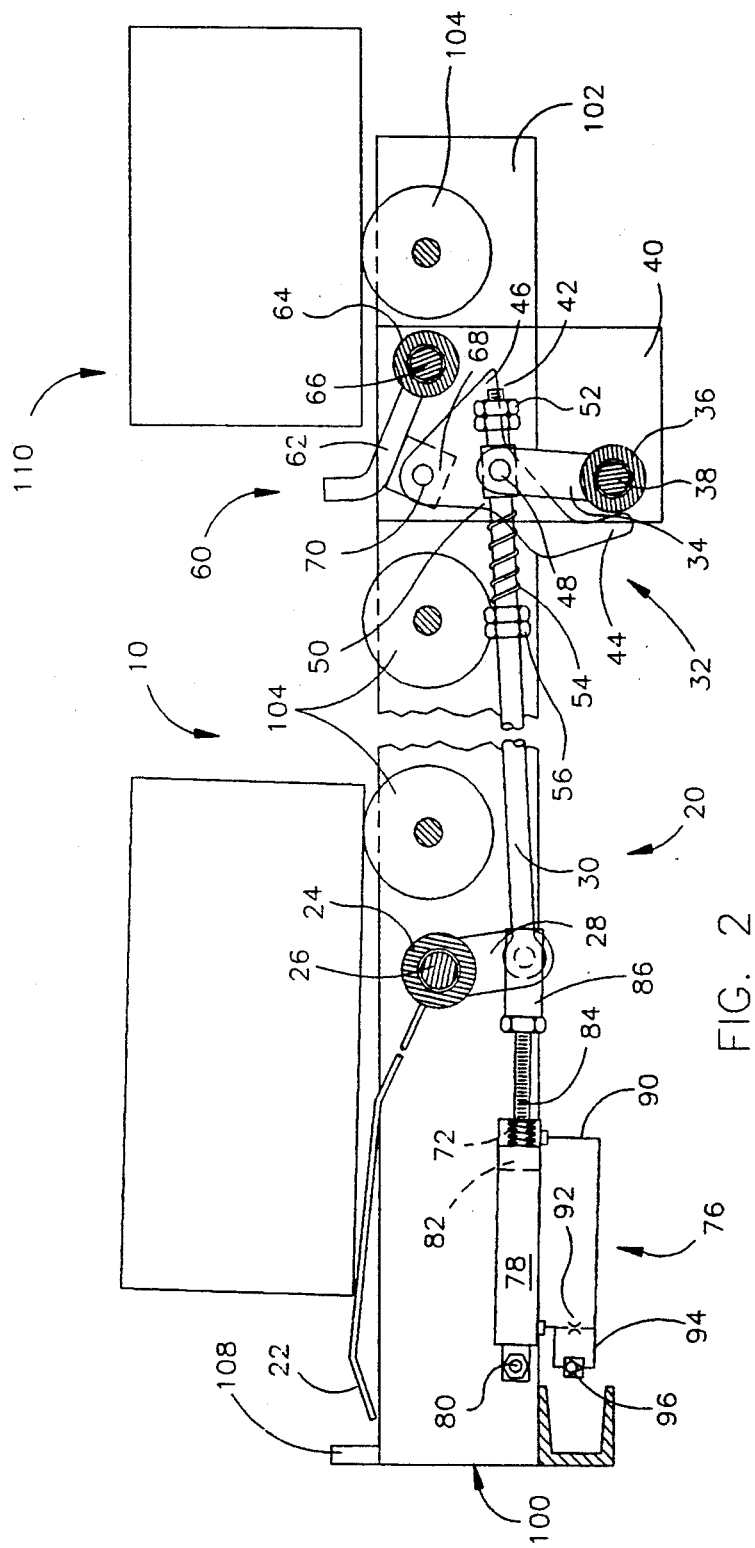
FIG. 2 is a longitudinal section view of a portion of a conveyor showing the load separating mechanism in a load releasing position.
Figure 3:
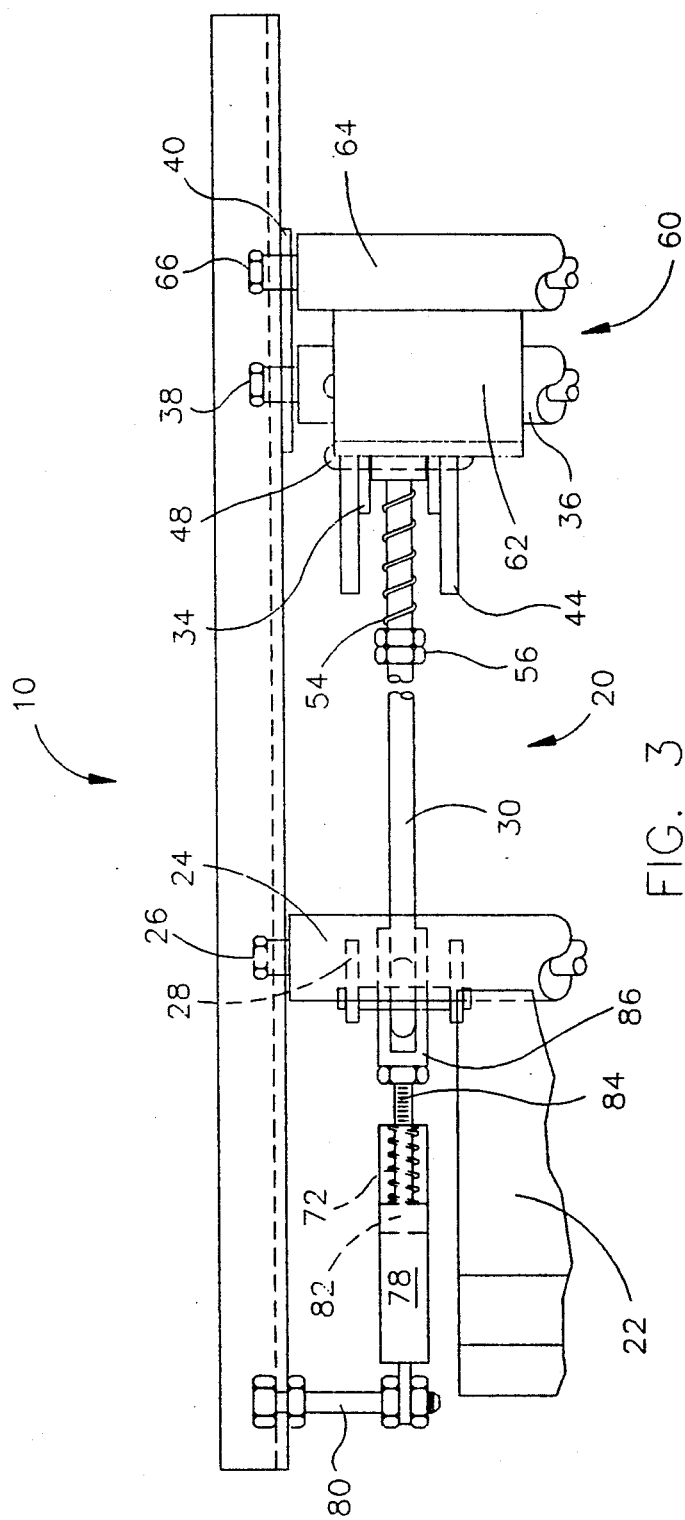
FIG. 3 is a fragmentary top plan view of the conveyor showing the load separating mechanism in the load blocking position.

The connecting rod 30 and toggle mechanism 32 function as a connecting means between the actuating lever 22 and stop latch 62. When the actuating lever 22 is in an extended position, as shown in FIG. 1, the stop latch 62 will be in a retracted, load releasing position. In this position, the projection 46 of the rocker arm 42 engages the sleeve 36 of the swing arm 34 to limit the downward movement of the stop latch 62. When the actuating lever 22 is moved to a retracted position by a load entering the discharge point, the connecting rod 30 is pushed rearwardly. The rearward motion of the connecting rod 30 causes the swing arm 34 to pivot clockwise, as shown in FIG. 2, and the rocker arm 42 to tilt forwardly. The combined motions of the swing arm 34 and rocker arm 42 raises the stop latch 62 to a load blocking position. In this position, the projection 44 butts against the front side of the sleeve 36 of the swing arm 34. The abutment of the projection 44 with the swing arm 34 limits the extent to which the stop latch 62 is raised.

The load separating mechanism 10 of the present invention operates as follows: when the lead load on the conveyor line reaches the discharge point, it engages the actuating lever 22 and moves it from the extended position shown in FIG. 1 to a retracted position shown in FIG. 2. The motion of the actuating lever 22 is translated by the connecting rod 30 and toggle mechanism 32 to the stop latch 62, which is raised to a load blocking position. As long as the actuating lever 22 remains depressed, the stop latch 62 will block the motion of the next load in line towards the discharge point. Thus, the lead load can be easily removed without other loads bearing against it. After the lead load is removed, a biasing means (described more fully below) causes the actuating lever 22 to return to an extended position. Again, the motion of the actuating lever 22 is translated by the connecting rod 30 and toggle mechanism 32 to the stop latch 62, which is lowered to a load releasing position. The next load is succession will then move towards the discharge point 106 and become the lead load. As is well known to those skilled in the art, a braking roller (not shown) is used to slow the acceleration of the second load in line to cause it to separate from the lead load. When the new lead load arrives at the discharge point 106, the actuating lever 22 is depressed and the stop latch 62 is raised to block the next load in line.

As described in the background of the invention, loads are sometimes conveyed on pallets which do not have a continuous bottom surface. In such cases, it may be possible for the actuating lever 22 to return to an extended position while a pallet carrying a load is positioned on top of the actuating lever 22. To prevent this from happening, the actuating lever 22 should be made long enough so that it engages the top surface of the pallet before the next load in line is released. The length of the actuating lever 22 will be necessitated by the size of the pallet.

Another problem encountered in prior art devices is that loads are released too quickly from the load holding point 110 upon removal of the lead load from the discharge point 106 of the conveyor 100. The load separating mechanism 10 of the present invention is designed to overcome this disadvantage with prior art mechanisms. More particularly, the load separating mechanism of the present invention includes means for delaying the release of a second load for a predetermined time period after a lead load is removed from the discharge point 106 of the conveyor 100. The delay means 76 comprises a fluid cylinder 78 which provides resistance against the biasing means. The resistance provided by the cylinder 78 increases the time needed for the load separating mechanism 10 to return to a non-blocking position after a load is removed.

The cylinder 78, which may be either pneumatic or hydraulic, is pivotally connected to the frame member 102 by means of a pivot pin 80. A piston 82 is mounted for reciprocal movement within the cylinder 78 and is connected to one end of a piston rod 84. The piston rod 84 of the cylinder 78 is connected at the opposite end to a bearing member 86 which is pivotally connected to the lever arm 28 and connecting rod 30. The piston rod 84 is extended when the actuating lever 22 is in the retracted position, and is retracted when the actuating lever 22 is in the extended position. A spring 72 is mounted within the cylinder 78 for biasing the actuating lever 22 to an extended position. One end of the spring 72 presses against the end of the cylinder 78 and the opposite end of the spring 72 presses against the piston 82 to bias the piston 82 and the actuating lever 22.

A line 90 connects opposite ends of the cylinder 78 to permit fluid to flow from one end thereof to the other. A flow restrictor 92 is disposed in the line 90 to restrict the flow of fluid. A check valve 96 is disposed in parallel to the flow restrictor 92 in a by-pass line 94.

When the lead load is removed from the discharge point 106, the spring 72 will urge the actuating lever 22 to an extended position. As the actuating lever 22 moves to an extended position, the piston 82 will force the fluid from the left end (as shown in FIG. 2) of the cylinder 78 through line 90 to the right end of the cylinder 78. The check valve 96 will prevent fluid from flowing through the by-pass line 94. Thus, the fluid must flow through the flow restrictor 92. The restricted flow slows the return of the actuating lever 22 back to the extended position. Since the actuating lever 22 is connected to the stop latch 62, the delay of the actuating lever 22 causes a corresponding delay in the release of the next load by the stop latch 62. The period of the delay can be controlled by varying the amount of flow restriction. A variable flow restrictor 92 could be used to make such adjustment.

When the actuating lever 22 is moved from the extended position towards the retracted position, the piston 82 will force the fluid to flow from the right end of the cylinder (as shown in FIG. 2) through line 90 to the left end of the cylinder. The flow restrictor 92 will be by-passed as the fluid flows through the by-pass line 94 so the motion of the actuating lever 22 is not effected by the cylinder 28. The flow restrictor 92, however, could be used to restrict the flow of fluid in both directions to delay the motion of the actuating lever 22, and thus the stop latch 62, in both directions.

The present invention may, of course, be carried out in other specific ways than those herein set forth without departing from the spirit and essential characteristics of the invention. The present embodiments are, therefore, to be considered in all respects as illustrative and not restrictive and all changes coming within the meaning and equivalency range of the appended claims are intended to be embraced therein.

What is claimed is:

1. A load separating mechanism for a roller conveyor comprising:
    (a) an actuating member movably mounted at a discharge point on said conveyor and normally disposed in an extended position in which the actuating member projects into the path of the loads being conveyed, said actuating member being moveable to a retracted position by contact with a first load as the first load reaches the discharge point;
    (b) a stop member movably mounted at a load holding point on the conveyor upstream from the discharge point and operatively connected to the actuating member for blocking a second load from being conveyed downstream while the first load is present at the discharge point, said stop means being moveable between a load blocking position when the actuating member is in a retracted position and a load releasing position when the actuating member is in the extended position;
    (c) biasing means for urging the actuating member to the extended position when the first load is removed from the discharge point; and
    (d) delay means for delaying the actuating member from returning to the extended position for a predetermined period after the first load is removed from the discharge point.

2. The load separating mechanism of claim 1 wherein said delay means comprises a fluid dampening means operatively connected to the actuating member.

3. The load separating of claim 2 wherein said fluid dampening means includes a fluid cylinder having opposing ends; a piston mounted within the cylinder for reciprocal movement; a piston rod connected to the piston and extending from a first end of said cylinder, said piston rod being operatively connected to the actuating member such that the piston is moved from the first end of the cylinder towards the second end as the actuating member moves from a retracted position to an extended position; a fluid line communicating with the opposing ends of the cylinder; and a flow restrictor disposed in said fluid line for restricting the flow of fluid between the second end of the cylinder and the first end of the cylinder as the actuating member moves from a retracted position to the extended position.

4. The load separating mechanism of claim 3 wherein said fluid dampening means further includes a by-pass means for permitting fluid flowing from the first end of the cylinder to the second end to by-pass said flow restrictor when the actuating member is moved from the extended position to the retracted position.

5. A load separating mechanism for a roller conveyor comprising:
    (a) a load stop means located at a load holding point on the conveyor for stopping loads from being conveyed downstream to a discharge point, said stop means being movable between a load blocking position and a load releasing position;
    (b) actuating means located at the discharge point and normally projecting into the path of the loads being conveyed, said actuating means being engaged and depressed by each load reaching the discharge point;
    (c) connecting means connecting said actuating means with said stop means such that the stop means is urged to an extended, load-blocking position when the actuating means is depressed by a load, and to a retracted, load releasing position when the actuating means returns to its extended position;
    (d) biasing means for biasing the actuating means to the extended position; and
    (e) delay means for delaying the actuating means from returning to its extended position after a load is removed from the discharge point.

6. The load separating mechanism of claim 5 wherein said delay means comprises a fluid dampening means operatively connected to the actuating means.

7. The load separating of claim 6 wherein said fluid dampening means includes a fluid cylinder having opposing ends; a piston mounted within the cylinder for reciprocal movement; a piston rod connected to the piston and extending from a first end of said cylinder, said piston rod being operatively connected to the actuating means such that the piston is moved from the first end of the cylinder towards the second end as the actuating means moves from a retracted position to an extended position; a fluid line communicating with the opposing ends of the cylinder; and a flow restrictor disposed in said fluid line for restricting the flow of fluid between the second end of the cylinder and the first end of the cylinder as the actuating means moves from a retracted position to the extended position.

8. The load separating mechanism of claim 7 wherein said fluid dampening means further includes a by-pass means for permitting fluid flowing from the first end of the cylinder to the second end to by-pass said flow restrictor when the actuating means is moved from the extended position to the retracted position.

9. An apparatus for use with a roller conveyor for conveying a plurality of loads, said roller conveyor including a discharge point at one end thereof, said apparatus being operable to separate one of said loads which is to be extracted from the discharge point from the other loads in line on the conveyor, said apparatus comprising:

(a) an actuating lever pivotally mounted at the discharge point of the roller conveyor said actuating lever being normally disposed in an extended position in which said actuating lever projects into the path of the load entering the discharge point and being movable to a retracted position by the load;

(b) first and second spaced apart pivot pins rigidly mounted to a portion of said roller conveyor spaced from the discharge point;

(c) a stop latch pivotally mounted to the first pivot pin, said stop latch being pivotable between an extended, load blocking position for blocking the movement of the loads toward the discharge point and a retracted, load releasing position for permitting at least one load to advance toward the discharge point;

(d) a toggle mechanism comprising first and second arms articulated to one another, said first arm being pivotally mounted to said stop latch at a point thereon spaced from the first pivot pin, said second arm being pivotally mounted to said second pivot pin, such that the articulation of said toggle mechanism causes said stop latch to pivot around said first pivot pin;

(e) said first arm of said toggle mechanism including first and second projections dimensioned to alternately pivot into abutment with at least one of said first and second pivot pins for defining a range of articulation for said toggle mechanism in both the extended and retracted positions of said stop latch;

(f) a rod extending from said actuating lever to a location on said toggle mechanisms spaced from said second pivot pin and from said stop latch such that the pivotal movement of said actuating lever causes simultaneous movement of said rod, articulation of said toggle mechanism and pivotable movement of said stop latch between said extended and retracted positions; and (g) delay means for delaying the actuating lever from returning to the extended position for a predetermined period after the first load is removed from the discharge point.

10. The load separating mechanism of claim 9 wherein said delay means comprises a fluid dampening means operatively connected to the actuating lever.

11. The load separating of claim 10 wherein said fluid dampening means includes a fluid cylinder having opposing ends; a piston mounted within the cylinder for reciprocal movement; a piston rod connected to the piston and extending from a first end of said cylinder, said piston rod being operatively connected to the actuating lever such that the piston is moved from the first end of the cylinder towards the second end as the actuating lever moves from a retracted position to an extended position; a fluid line communicating with the opposing ends of the cylinder; and a flow restrictor disposed in said fluid line for restricting the flow of fluid between the second end of the cylinder and the first end of the cylinder as the actuating lever moves from a retracted position to the extended position.

12. The load separating mechanism of claim 11 wherein said fluid dampening means further includes a by-pass means for permitting fluid flowing from the first end of the cylinder to the second end to by-pass said flow restrictor when the actuating lever is moved from the extended position to the retracted position.

13. A roller conveyor including means for separting one load which is to be extracted from a discharge point on the conveyor from the other loads on the conveyor, comprising:

(a) a pair of spaced apart frame members;

(b) a plurality of longitudinally spaced rollers rotatively mounted between said frame members and defining a load carrying surface for conveying loads toward said discharge point;

(c) a stop member pivotally mounted at a load holding point on the conveyor upstream from the discharge point for blocking the movement of loads towards the discharge point, said stop means being moveable between a retracted, load releasing position, and an extended, load blocking position;

(d) an actuating member movably mounted at the discharge point on the conveyor for detecting the presence of the load at the discharge point, said actuating member being normally disposed in an extended position in which the actuating lever projects into the path of the load entering the discharge point and being moveable to a retracted position by the load;

(e) connecting means connecting said actuating means with said stop means such that the stop means is urged to an extended, load blocking position when the actuating means is depressed by a load, and to the retracted, load releasing position when the actuating member returns to its extended position; and (f) delay means for delaying the actuating member from returning from its extended position after a load is removed from the discharge station.

14. The load separating mechanism of claim 13 wherein said delay means comprises a fluid dampening means operatively connected to the actuating member.

15. The load separating of claim 14 wherein said fluid dampening means includes a fluid cylinder having opposing ends; a piston mounted within the cylinder for reciprocal movement; a piston rod connected to the piston and extending from a first end of said cylinder, said piston rod being operatively connected to the actuating member such that the piston is moved from the first end of the cylinder towards the second end as the actuating member moves from a retracted position to an extended position; a fluid line communicating with the opposing ends of the cylinder; and a flow restrictor disposed in said fluid line for restricting the flow of fluid between the second end of the cylinder and the first end of the cylinder as the actuating member moves from a retracted position to the extended position.

16. The load separating mechanism of claim 15 wherein said fluid dampening means further includes a by-pass means for permitting fluid flowing from the first end of the cylinder to the second end to by-pass said flow restrictor when the actuating member is moved from the extended position to the retracted position.

* * * * *